Oct. 1, 1946.　　　　E. E. TURNER, JR　　　　2,408,458
APPARATUS FOR ECHO DISTANCE MEASUREMENT
Original Filed Jan. 5, 1940　　　3 Sheets—Sheet 1

INVENTOR.
Edwin E Turner Jr.
BY
ATTORNEY.

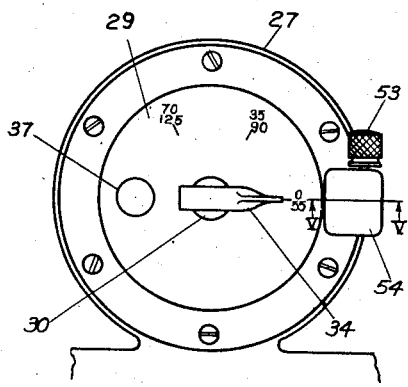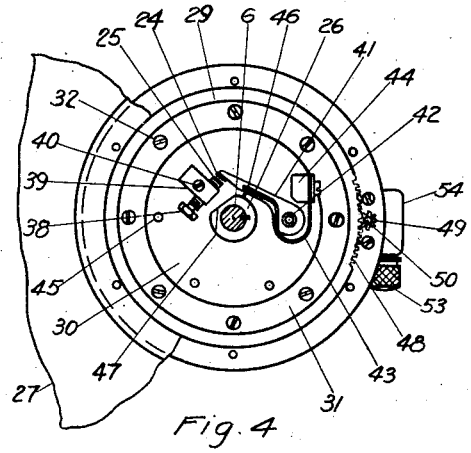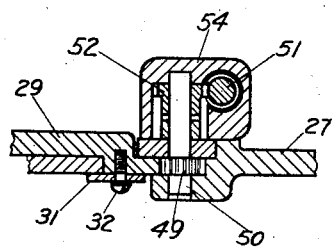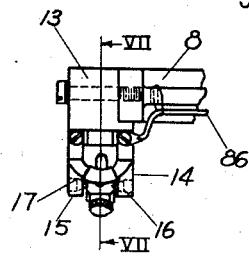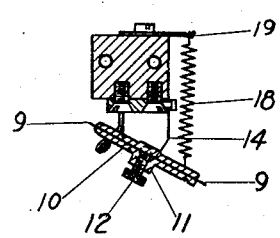

Oct. 1, 1946.   E. E. TURNER, JR   2,408,458
APPARATUS FOR ECHO DISTANCE MEASUREMENT
Original Filed Jan. 5, 1940    3 Sheets-Sheet 3

INVENTOR
EDWIN E. TURNER JR.
BY
ATTORNEY

Patented Oct. 1, 1946

2,408,458

UNITED STATES PATENT OFFICE 2,408,458

APPARATUS FOR ECHO DISTANCE MEASUREMENT

Edwin E. Turner, Jr., West Roxbury, Mass., assignor, by mesne assignments, to Submarine Signal Company, Boston, Mass., a corporation of Delaware Original application January 5, 1940, Serial No. 312,504. Divided and this application July 25, 1941, Serial No. 404,052

6 Claims. (Cl. 234—1.5)

The present application is a division of my copending application Serial No. 312,504 filed Jan. 5, 1940, now abandoned.

The present invention relates to echo distance measuring systems and to recording apparatus therefor.

The general principle of echo distance measurement and depth sounding is well known. A compressional wave impulse is transmitted to the water and the reflected signal is received and used to operate an exhibitor. The time interval between the emitted signal and the received echo is a measure of the distance or depth. This time interval is frequently measured by comparing it with a constant known speed. Thus where a record of the depth is desired, a marking element is usually moved at a constant speed over a chart, a signal impulse being emitted at the instant the marking point crosses a zero line on the chart and a mark being made on the chart at the instant the echo is received. If the chart be continuously advanced between soundings, the record of the successive periodic measurements will form a graph of the depths traversed. Recording instruments of this type have heretofore been used with more or less success.

The present invention relates more particularly to a receiving circuit for receiving the echo and causing the same to produce a mark on the record paper or to operate an indicator. When long distances are being measured, the received echo signal is relatively weak and a large amount of amplification is required. On the other hand, when short distances are being measured, the echo is relatively strong and sufficient energy to operate the exhibitor can be obtained with less amplification. It is always desirable to reduce the sensitivity of the receiving apparatus as much as possible in order that undesired stray signals may be eliminated. Therefore, it is desired to use a low receiver sensitivity when small distances are being measured and a high receiver sensitivity when large distances are being measured.

The present invention provides a receiving circuit whereby the sensitivity is automatically controlled by the intensity of the received echo impulse.

Figures 1, 1A:
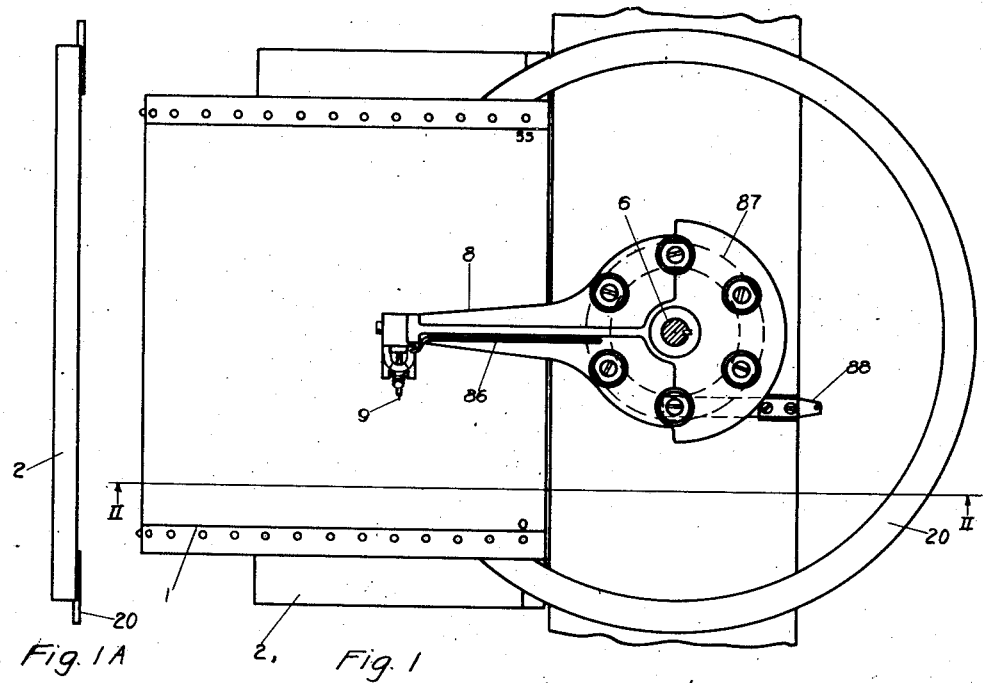
Figure 2:
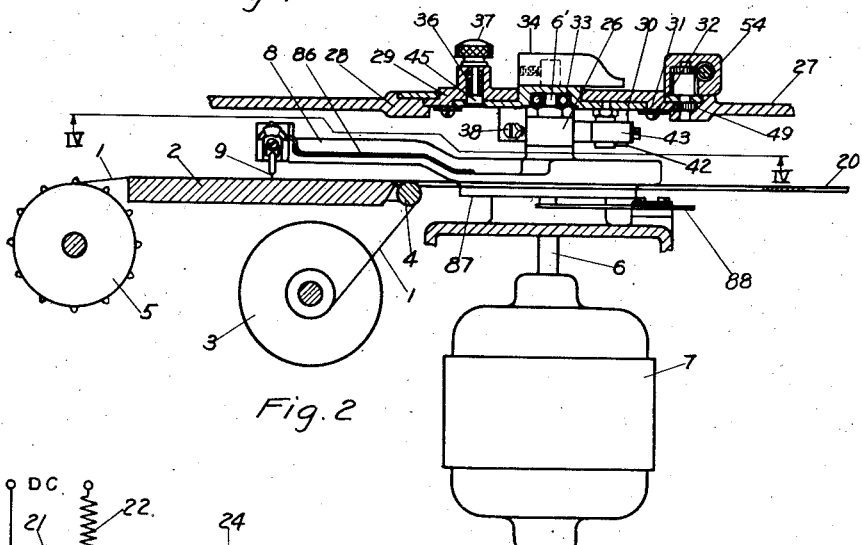
Figure 8:
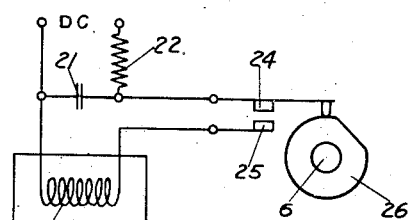
Figure 9:
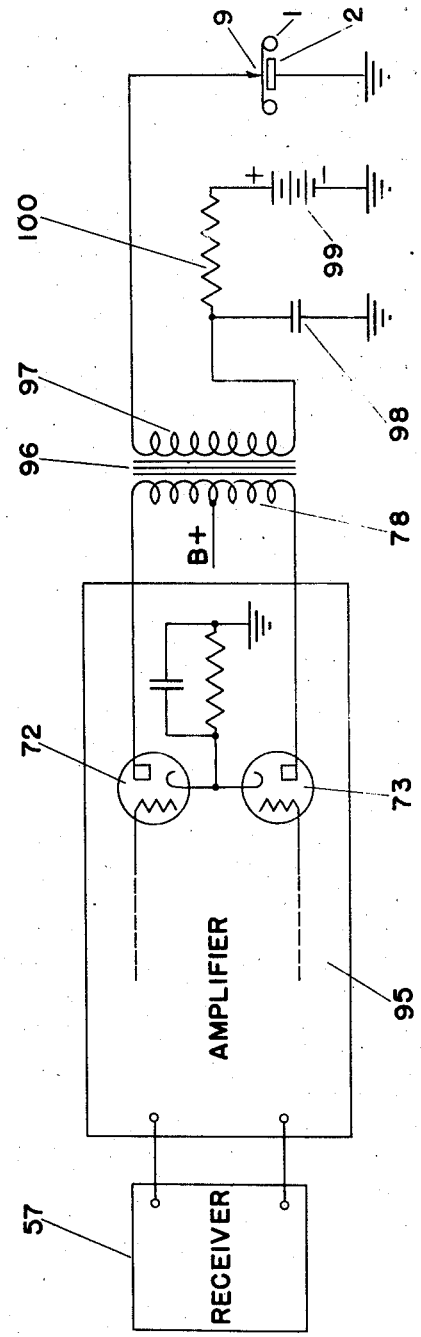

The invention will best be understood from the following description taken in connection with the accompanying drawings in which Fig. 1 shows a plan view of the record chart and marking element; Fig. 1a is an end elevation of the marking platen; Fig. 2 is a partial section of the arrangement shown in Fig. 1 and including also the range-shifting mechanism; Fig. 3 is a front elevation of the scale-shifting mechanism; Fig. 4 is a section of Fig. 2 taken along the line IV—IV and may be regarded as a back elevation of a portion of the range-shifting mechanism; Fig. 5 is an enlarged cross section of the zero adjustment taken along the line V—V in Fig. 3; Fig. 6 is an enlarged plan view of the marking stylus holder; Fig. 7 is an enlarged section of the same; Fig. 8 is a schematic wiring diagram of the transmitting circuit; and Fig. 9 shows a schematic wiring diagram of the receiving circuit according to the invention.

As shown in Figs. 1 and 2 a chart or record paper I is passed over a platen 2 of conducting material from the roll 3 over an idling roller 4 to a take-up spool 5. Mounted on a shaft 6 rotated at a constant speed by motor 7 is an arm 8 which carries the marking stylus 9. The motor 7, while shown for simplicity as being directly connected to the arm 8, may, of course, be coupled to it through suitable gearing if desired. The record paper is preferably of the type having a conductive carbon back with a thin light-colored coating on its front surface which is removed by the passage of an electric current through the paper. As will more fully appear, the current is passed from the stylus 9 through the paper I to the platen 2. Since the stylus itself is not required to do any work, it is only necessary that it remain lightly in contact with the paper at all times during its passage across the paper. The stylus is therefore in the form of a fine wire which is lightly pressed against the paper. The stylus holder can be seen in Fig. 2 and in the enlarged views of Figs. 6 and 7. The fine wire forming the stylus 9 is passed through a small hole in a cylindrical member 10 which is provided with a collar 11 at the center of mass of the member 10. A thumb screw 12 passing through the collar and into the member 10 serves to hold the stylus wire in position. As the marking end of the wire wears away, readjustment can readily be made by loosening the screw 12 and pushing the wire 9 farther through the member 10 until the desired point is again obtained.

The rotating arm 8 is provided at its end with a block 13 to which two plates 14 and 15 are fastened. These are provided with pivots 16 and 17 which engage the collar 11 to support the stylus on the arm 8. A light spring 18 fastened to the bottom end of the stylus holder 10 and to an extension 19 fastened to the block 13 provides the necessary tension to press the stylus against the paper. The spring, moreover, serves to make good electrical connection between the stylus and conductor 86 which is connected to a slipring 87 insulated from the arm and the shaft.

In measuring shallow depths it is necessary to move the stylus across the chart paper very rapidly. Since the stylus is mounted at the end of the rotation arm 8, the stylus will describe a circle and will only periodically pass across the paper. In order to avoid any bouncing or chattering of the stylus as it moves across the chart a circular track 20 is provided against which the stylus bears while it is off the paper. The track 20 is fastened to or made integral with the platen 2. The latter is grooved slightly as shown in Fig. 1a, so that the surface of the paper lies in the same plane or very slightly below the surface of the track 20 and the edges of the platen. By this means the stylus rides onto the paper without any vibration and tearing of the edges of the paper is wholly avoided.

If a signal is emitted each time the marking point crosses the zero line, the maximum depth which can be recorded is that which corresponds to a time of travel of the wave from the ship to the bottom and back equal to the time required for the point 9 to move from the zero line to the line 55 at the opposite edge of the chart. In order to make it possible to use the instrument for deeper depths provision is made whereby the scale represented by the chart can be changed to include different depth ranges.

This involves the transmitting circuit shown in Fig. 8. A condenser 21 is charged from a source of direct current through a charging resistor 22. When a signal is to be transmitted, the capacitor 21 is discharged through the windings 23 of a compressional wave producing device by the closing of contacts 24 and 25 through the operation of a cam 26 fixed to the rotating shaft 6 which also carries the marker arm 8. Thus a signal will be transmitted once during each revolution of the arm 8.

Zero adjustment and range selection are accomplished by varying the position of the contacts 24, 25 with respect to the cam 26 whose position bears a definite relation to the position of the stylus-carrying arm 8. The arrangement is shown in more detail in Figs. 2 to 5.

In the upper part of a frame 27 which may be a portion of the housing of the recorder there is formed a circular aperture concentric with the axis of the shaft 6. The edges of the frame 27 at the aperture are thickened as at 28. The thickened portion is provided with an annular recess into which a flanged plate 29 is fitted. The plate 29 is provided with a central aperture and a recess on its inner side into which the flanged plate 30 is held by a supporting ring 31 and screws 32. The plate 30 carries ball bearing 33 forming the upper support for the end 6′ of the shaft 6. The plate 30 is sufficiently loosely fitted into the plate 29 so that the plate 30 is rotatable by means of the knob 34. The plate 30 can, however, be locked in a series of predetermined positions by means of a pin 45 which is by means of spring 36 pressed into apertures in the plate 30 which are spaced to correspond to the predetermined positions above mentioned. When it is desired to rotate the plate 30 to a new position, the pin 45 is released by pulling upwards on the knurled knob 37 (Fig. 2). The plate 30 carries the contact mechanism which is best seen in Fig. 4. Contact 25 is fixed to the plate 30 as by the screw 38 and the block 39 which is mounted on the plate 30 by the screw 40. The movable contact 24 is mounted on an arm 41 pivoted at 42. A spring 43 fixed to the plate 30 by means of the bracket 44 serves to tension the contact 24 against contact 25. The contacts, which are suitably insulated from each other, are operated by the cam-follower 46 which is fixed to the arm 41 and which bears against the cam 26. The cam 26 may be circular with a flat portion 47 as shown in Fig. 4. When the follower 46 is in contact with the flat portion 47 of the cam, the contacts 24 and 25 are closed whereas during the remaining portion of the revolution of the cam 26 the contacts remain open. The cam 26 is positioned on the shaft 6 in such a way with respect to the marking arm 8 that a signal is normally transmitted at the instant the marking stylus 9 crosses the zero line on the chart 1.

Assuming that the time of travel of the stylus 9 across the chart corresponds to a depth of 55 feet it will be evident that in order to record depths greater than 55 feet the outgoing signal must be emitted prior to the instant at which the stylus 9 crosses the zero line. A second depth range of say 35 to 90 feet may, therefore, be chosen. The outgoing signal is produced at the proper instant for this purpose by rotating the plate 30 by means of the knob 34 carrying the contact assembly through an angle equal to the angle traversed by the stylus 9 between the zero and 35 foot lines on the chart. The cam follower 46 is thereby rotated with respect to the cam 26 so that the outgoing signal will be produced at the proper instant.

Other depth ranges can be provided in a similar manner, the contact position being shifted with respect to the cam as predetermined by the location of the holes in the plate 30 which are engaged by the pin 45. The knob 34 may also serve as a pointer to indicate the depth range selected, the ranges being engraved on the plate 29 as shown in Fig. 3.

In order to provide a zero adjustment the plate 29 has a plurality of teeth 48 cut in a portion of its periphery, the teeth being engaged by a pinion 49 whose shaft 50 is driven by a gear 52 and a worm 51 which is rotatable by the knob 53. This arrangement is best shown in Figs. 4 and 5. The worm 51 and gear 52 are mounted in a housing 54 which is fixed to the frame or case 27 of the instrument.

The receiving circuit in accordance with the present invention is shown in Fig. 9.

A compressional wave receiver is schematically indicated at 57. This is connected to the input stages of a suitable amplifier 95 having the push-pull output stage comprising the two tubes 72 and 73. The cathodes of these tubes are shown connected together and to ground through a resistor shunted by a condenser. The anodes of the tubes are connected to the primary 78 of an output transformer 96, the center tap of the primary being connected to a suitable plate supply the negative terminal of which is grounded. The secondary 97 of the output transformer has one terminal connected to the stylus 9 of a recorder, the circuit being completed to ground through the record paper 1 and the conductive platen 2. It is contemplated here to use a record paper of the type having a conductive carbon back with a thin, light-colored, slightly insulating coating on its front surface which is removed by the passage of an electric current through the paper. Further details of a suitable recorder can be found in my copending application Serial No. 312,504, filed January 5, 1940. Other types of recorders or indicating devices may, of course, be used if desired. The other terminal of the secondary 97 is connected to ground through a capacitor 98. The latter is maintained in a discharged state by the contact by the stylus 9 with the platen 2 or other suitable conductive material arranged to contact the stylus before it travels on to the surface of the record paper 1. When the stylus 9 moves over the surface of the record paper which acts as an insulator up to a certain critical breakdown potential, the capacitor 98 gradually becomes charged by the battery 99, which is in series with the resistance 100. The other terminal of the resistor 100 is connected to one side of the capacitor 98, the remaining terminals of both capacitor and battery being connected to ground as indicated. The polarity of the battery is so arranged that the potential across the condenser which is in series with the secondary 97 will aid the signal impulse potential in providing enough potential to cause the stylus 9 to make a mark on the paper.

Thus, near the beginning of the stylus travel over the paper, the condenser will have only a very small charge. The echo signal impulse, if it returns at this time, will consequently receive substantially no aid from the condenser in breaking down the insulating coating on the record paper. However, since the beginning of the stylus travel over the paper corresponds to a short elapsed time interval since the emission of the direct signal, the echo signal impulse at this time will not have travelled over a very great distance and will have considerable strength. The amplification of the system is adjusted so that the strength of echoes returning from short distances will be just sufficient to cause the stylus to produce a mark on the record paper. Thus, when short distances are being measured and the reflected impulse has a relatively high intensity, there will be substantially no charge on the condenser and the echo impulse must mark the record paper unaided. On the other hand, as the depth and the time interval being measured increase, the echo impulse intensity and the intensity of the potential produced thereby in the secondary 97 will decrease but the condenser 98 will provide an increasingly large potential in aid of the echo impulse potential. By this means I obtain an effective automatic control of the sensitivity of the system which reduces the indication of undesired stray signals to a minimum.

It will be understood that this arrangement can also be applied to other types of exhibitors.

The term "exhibitor" in this specification and in the claims following is used in a generic sense to include any device which is capable of producing a sensory impression.

The term "indicator" in this specification and in the claims following is used in a generic sense to include any device which is capable of producing a sensory impression. Thus a recording device is a specific kind of indicator, as is also an electric discharge tube device.

Having now described my invention, I claim:

1. In an echo distance measuring system of the type in which the time interval is measured between direct and reflected signal impulses, the reflected impulse having an intensity which decreases as the length of the time interval being measured increases, the combination of a recording device having a stylus, a platen and a record paper between them, said stylus being adapted to be moved repeatedly over the record paper at a constant speed, said direct impulses being transmitted in synchronism with the repeated excursions of said stylus over the record paper, and said paper being of the type which will permit the passage of an electric current through it upon the application of at least a minimum potential between the stylus and the platen, means for applying directly between the stylus and the platen a potential substantially constantly proportional to the intensity of the reflected impulse, and means for applying directly between the stylus and the platen in aid of said potential a further potential which increases from a predetermined value beginning with each excursion of the stylus over the record paper.

2. In an echo distance measuring system of the type in which the time interval is measured between direct and reflected signal impulses, the reflected impulse having an intensity which decreases as the length of the time interval being measured increases, the combination of a recording device having a stylus, a platen and a record paper between them, said stylus being adapted to be moved repeatedly over the record paper at a constant speed, said direct impulses being transmitted in synchronism with the repeated excursions of said stylus over the record paper, and said paper being of the type which will permit the passage of an electric current through it upon the application of at least a minimum potential between the stylus and the platen, means for applying directly between the stylus and the platen a potential substantially constantly proportional to the intensity of the reflected impulse, and means for applying directly between the stylus and the platen in aid of said potential a further potential which increases exponentially from zero beginning with each excursion of the stylus over the record paper.

3. In an echo distance measuring system of the type in which the time interval is measured between direct and reflected signal impulses, the reflected impulse having an intensity which decreases as the length of the time interval being measured increases, the combination of a recording device having a stylus, a platen and a record paper between them, said stylus being adapted to be moved repeatedly over the record paper at a constant speed, said direct impulses being transmitted in synchronism with the repeated excursions of said stylus over the record paper, and said paper being of the type which will permit the passage of an electric current through it upon the application of at least a minimum potential between the stylus and the platen, means for applying directly between the stylus and the platen a potential substantially constantly proportional to the intensity of the reflected impulse and means for applying directly between the stylus and the platen in aid of said potential a further potential which increases exponentially from zero beginning with each excursion of the stylus over the record paper, said means comprising a capacitor connected in circuit with the stylus, means discharging the capacitor just prior to the beginning of each travel of the stylus over the paper, and means for charging the capacitor during the stylus travel over the paper until the potential produced by a received signal impulse plus the capacitor's potential at least equals said minimum potential.

4. In an echo distance measuring system of the type in which the time interval is measured between direct and reflected signal impulses, the reflected impulse having an intensity which decreases as the length of the time interval being measured increases, the combination of an exhibitor for exhibiting the moment of receipt of the reflected impulse, said exhibitor having an exhibiting element requiring at least a minimum potential for operation, means for applying directly to the exhibiting element a potential substantially constantly proportional to the intensity of the reflected impulse, and means for applying directly to the exhibiting element in aid of the reflected impulse potential a potential which increases with the length of the time interval being measured.

5. In an echo distance measuring system of the type in which the time interval is measured between direct and reflected signal impulses, the reflected impulse having an intensity which decreases approximately exponentially as the length of the time interval being measured increases, the combination of an exhibitor for indicating the moment of receipt of the reflected impulse, said exhibitor having an exhibiting element requiring at least a minimum potential for operation, means for applying directly to the exhibiting element a potential substantially constantly proportional to the intensity of the reflected impulse and means for applying directly to the exhibiting element in aid of the reflected impulse potential a potential varying approximately exponentially with the length of the time interval being measured, said means comprising a capacitor connected in circuit with said exhibiting element, means discharging the capacitor prior to each time interval to be measured, and means for gradually charging the capacitor during the continuance of the time interval.

6. In an echo distance measuring system of the type in which the time interval is measured between direct and reflected signal impulses, the reflected impulse having an intensity which decreases approximately logarithmically as the length of the time interval being measured increases, the combination of an exhibitor for indicating the moment of receipt of the reflected impulse, said indicator having an exhibiting element requiring at least a minimum potential for operation, means for applying directly to the exhibiting element a potential substantially constantly prooprtional to the intensity of the reflected impulse, and means for applying directly to the exhibiting element in aid of the reflected impulse potential a potential varying approximately exponentially with the length of the time interval being measured.

EDWIN E. TURNER, Jr.